(No Model.) 2 Sheets—Sheet 1.

H. & J. H. SMITH.
HARVESTER.

No. 343,078. Patented June 1, 1886.

Witnesses
Jos. S. Latimer
F. W. Lane

Inventor
Hiram Smith & Jesse H. Smith,
By their Attorney
Arthur H. Browne.

(No Model.) 2 Sheets—Sheet 2.

H. & J. H. SMITH.
HARVESTER.

No. 343,078. Patented June 1, 1886.

Witnesses
Jos. S. Latimer

Inventors
Hiram Smith & Jesse H. Smith
By their Attorney
Arthur H. Browne

UNITED STATES PATENT OFFICE.

HIRAM SMITH AND JESSE H. SMITH, OF ADRIAN, ASSIGNORS OF ONE-FOURTH TO H. W. BORDWELL, OF JACKSON, MICHIGAN.

HARVESTER.

SPECIFICATION forming part of Letters Patent No. 343,078, dated June 1, 1886.

Application filed September 19, 1885. Serial No. 177,529. (No model.)

*To all whom it may concern:*

Be it known that we, HIRAM SMITH and JESSE H. SMITH, citizens of the United States, residing at Adrian, in the county of Lenawee and State of Michigan, have invented certain new and useful Improvements in Harvesters; and we do declare the following to be a full, clear, and exact description of the invention, reference being had to the accompanying drawings, which form a part of this specification.

In an extensive class of self-binding harvesters, of which the "Esterly" is a well-known example, the frame of the harvester or grain-platform constitutes a rigid part of the main frame of the machine. In these machines there is a single driving-wheel located centrally in the main frame, and the outer end of the grain-platform is supported by a grain-wheel, which is usually adjustable, to enable the grain-platform to be elevated or depressed. The rigidity of the grain-platform is rendered necessary by the fact that the machine has but one supporting-wheel besides the outer grain-wheel. The result is that the harvester takes up considerable room, a manifest disadvantage when the harvester is being stored or transported.

The object of this invention is, to so hinge the grain-platform in this type of harvesters that it may be folded up when not in use, and at the same time preserve its rigidity when in use, and require no addition to the number of supporting-wheels.

Figure 1:
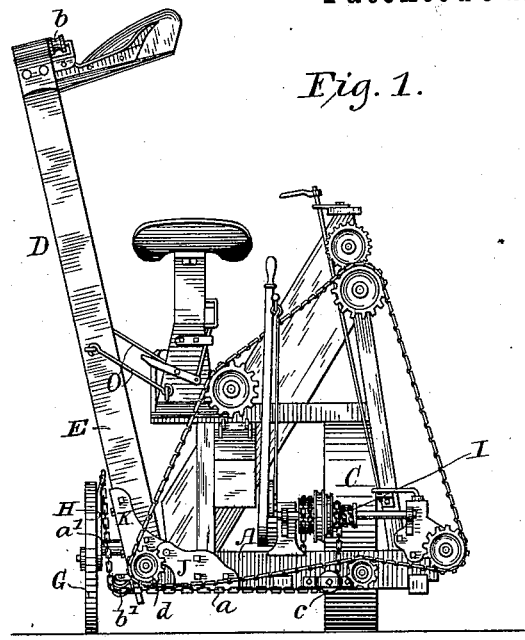
Figure 2:
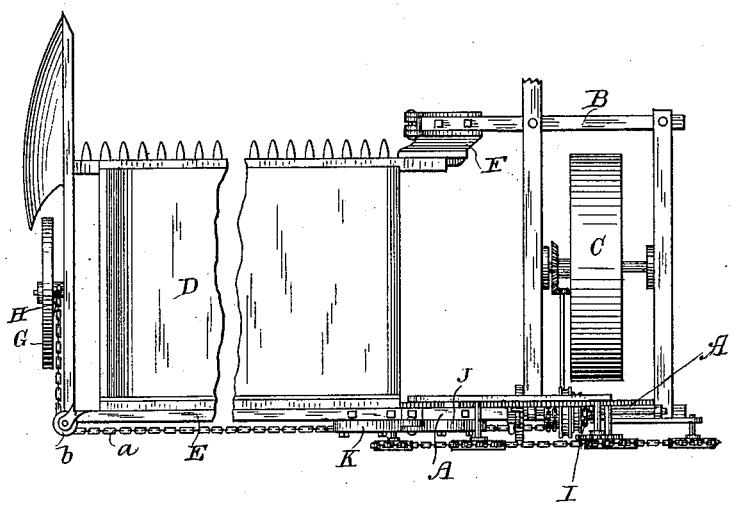
Figure 3:
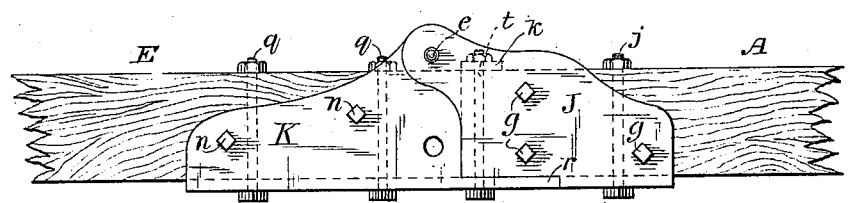
Figure 4:
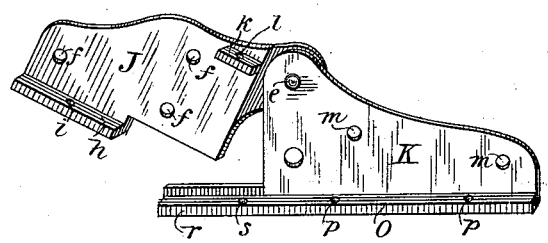
Figure 5:
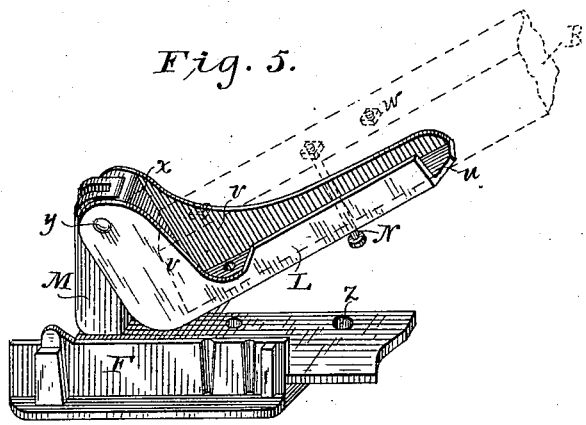

The invention is illustrated in the drawings, in which Figure 1 is a rear view of the framework of an Esterly harvester provided with a hinged grain-platform, and showing the platform folded up. Fig. 2 is a plan view of the same, showing the platform folded down. Figs. 3 and 4 are detail views of the back hinge, and Fig. 5 is a detail view of the front hinge. In Figs. 4 and 5 the parts J and L are shown raised for convenience of illustration.

Like letters designate corresponding parts in all of the figures.

A is the back horizontal sill, B the front horizontal sill, of the main frame, and C is the main driving-wheel of a harvester.

The binding mechanism, which is not shown, is located to the right of the main frame, and to the left is located the grain-platform D.

The back beam, E, of the grain-platform is usually a continuation of and integral with the back sill, A, of the main frame.

F is the finger-bar shoe, rigidly secured to the platform and connected with the front sill, B.

G is the grain-wheel, which is mounted on the outer end of the platform by the usual adjustable lever, H. This lever is connected in the ordinary manner by a chain, $a$, to an operating-windlass, I, passing over pulleys $b$ and $c$.

Just back of the chain-wheel $d$, which operates the usual endless carrier on the platform, the beam E of the platform is hinged to the back sill, A, of the main frame.

The connecting-hinge is composed of two parts, J and K, pivoted together by a bolt, $e$. The casting J is provided with bolt-holes $f f$, through which it is bolted to the sill A by horizontal bolts $g g$. The casting J is also formed with an inwardly-extending horizontal flange, $h$, at the bottom, which passes under the sill A, and is provided with a bolt-hole, $i$, through which it is bolted to the sill A by a vertical bolt, $j$, passing entirely through the sill. The flange $h$ does not extend the entire length of the casting J, the part of the casting nearest the pivot being without the flange. At its upper part, close to the pivot $e$, the casting J is formed with an inwardly-extending horizontal flange, $k$, having bolt-hole $l$. The second casting, K, is formed with bolt-holes $m m$, through which it is bolted to the platform-beam E by horizontal bolts $n n$. This casting is formed with an inwardly-projecting flange, $o$, at the bottom, which extends beneath the beam E. This flange is formed with bolt-holes $p p$, through which it is bolted by vertical bolts $q q$ to the beam E. This flange is formed with an extension, $r$, which projects beyond the casting K toward the casting J. When the platform is in position for use, this extension extends beneath the casting J and the sill A, thus forming a support for the platform, and relieving the pivot $e$ of the weight of the platform. This extension is formed with a bolt-hole, $s$, and through this and the bolt-hole $l$ in the upper flange, $k$, on casting J, a bolt, $t$, is inserted to hold the two castings rigidly together when the platform is in position for use, and thus prevent oscillation of the platform. When the platform is folded up, the bolt $t$ is removed, and the platform is free to be turned on the pivot $e$.

The finger-bar shoe F is hinged to the front sill, B, of the harvester. An elbow-shaped casting, L, is rigidly secured to the end of the sill B. This casting has a bottom plate, $u$, and side flanges, $v\ v$, which embrace the bottom and sides of the sill B. The bottom plate, $u$, is formed with bolt-holes, through which vertical bolts $w\ w$ pass to secure the casting to the sill B. The casting has a vertical face, $x$, against which the end of the sill B abuts, and this face is set back between the flanges $v\ v$, forming a recess in which is held a vertical post, M, forming part of the shoe F. This post is pivoted near its upper end by a bolt, $y$, passing through it and the flanges $v\ v$ of the casting L.

When the platform is lowered in position for use, the bottom of the casting rests on the shoe, and the face-plate $x$ rests against the post M, so that the weight of the platform is sustained thereby. A bolt, N, which passes through the sill B, bottom $u$, of casting L, and aperture $z$ in shoe F, holds the shoe and front sill rigidly together. When the platform is to be raised, this bolt N is removed. When bolts N and $t$ are withdrawn, the platform can be folded up, as shown in Fig. 1, and it is held elevated by hooks O. When the platform is to be folded, the pitman which operates the cutter-bar will of course be first disconnected, and the beating-reel will be dismounted and placed on top of elevator-frame, as will be readily understood.

The elevation of the grain-platform lifts the grain-wheel from the ground, renders it inoperative, and so leaves the harvester with but one supporting-wheel. To obviate this, and at the same time to dispense with an extra wheel, the grain-wheel is made removable, and is transferred to a suitable bearing, $a'$, located at the bottom of the grain-platform, as indicated in Fig. 1. In case the adjustable lever H is used, as is usually done, the lever will be mounted in bearing $a'$ instead of the wheel itself. The chain $a$, which connects the lever H to the operating-windlass I, passes over a pulley, $b'$, mounted in a removable strap, which is bolted to the extension $r$ of flange $o$ of casting K, the bolt-hole $s$ being utilized for this purpose.

We claim as our invention—

1. The back sill of the main frame of a harvester and a casting bolted thereto, said casting having a projecting flange at the upper end thereof, in combination with the back beam of a folding grain-platform, a casting bolted thereto and pivoted to the casting on the main frame, and provided with a projecting flange at the bottom thereof, and a bolt which passes through said projecting flanges on the two castings, substantially as set forth.

2. The back beam, A, the casting J, provided with inwardly-projecting flanges $h$ and $k$, and horizontal and vertical bolts which pass through the body of the casting and the flange $h$ and secure the casting to the sill A, in combination with the back beam, E, of a folding platform, the casting K, provided with inwardly-projecting flange $o$, having extension $r$, horizontal and vertical bolts which pass through the body of the casting and the flange $o$ and secure the casting to the beam E, and a bolt which passes through the flange $k$ and extension $r$ and secures the castings J and K together, substantially as set forth.

3. The finger-bar shoe of a harvester and a vertical post integral therewith, in combination with the front sill of the main frame of the harvester, a casting bolted to said sill and pivotally connected to said shoe-post, and a bolt passing through said shoe and through the front sill and its casting, substantially as set forth.

In testimony whereof we affix our signatures in presence of two witnesses.

HIRAM SMITH.
JESSE H. SMITH.

Witnesses:
HENRY C. SMITH,
W. S. LAGORE.